United States Patent
Tang et al.

(10) Patent No.: US 8,792,637 B2
(45) Date of Patent: Jul. 29, 2014

(54) DOWNLOADING OF DATA TO SECURE DEVICES

(75) Inventors: Lawrence W Tang, San Diego, CA (US); Douglas M Petty, San Diego, CA (US); Michael T Habrat, San Diego, CA (US)

(73) Assignee: Combined Conditional Access Development & Support, LLC, Philadelphia, PA (US)

( * ) Notice: Subject to any disclaimer, the term of this patent is extended or adjusted under 35 U.S.C. 154(b) by 89 days.

(21) Appl. No.: 13/302,639

(22) Filed: Nov. 22, 2011

(65) Prior Publication Data

US 2013/0129086 A1   May 23, 2013

(51) Int. Cl.
*H04L 9/00* (2006.01)
*H04L 29/06* (2006.01)
*H04L 9/32* (2006.01)
*G06F 21/00* (2013.01)
*G06F 12/14* (2006.01)
*H04L 9/08* (2006.01)

(52) U.S. Cl.
CPC ............ *H04L 9/0891* (2013.01); *H04L 9/0861* (2013.01); *H04L 63/0435* (2013.01); *H04L 63/0428* (2013.01); *H04L 9/3236* (2013.01)
USPC ............. 380/44; 380/277; 713/150; 713/168; 713/189; 713/190

(58) Field of Classification Search
CPC ....... G06F 21/10; G06F 21/606; G06F 21/62; H04L 12/40104; H04L 9/0844; H04L 63/0428; H04L 9/3236
USPC ..................... 380/255, 259, 44–47, 277–286; 713/150, 168, 170, 189, 190
See application file for complete search history.

(56) References Cited

U.S. PATENT DOCUMENTS

| | | | | |
|---|---|---|---|---|
| 5,751,812 A * | 5/1998 | Anderson | ...... | 713/155 |
| 5,841,871 A * | 11/1998 | Pinkas | ...... | 713/155 |
| 6,697,945 B2 * | 2/2004 | Ishiguro et al. | ...... | 713/171 |
| 6,831,982 B1 * | 12/2004 | Hughes et al. | ...... | 380/281 |
| 6,934,463 B2 * | 8/2005 | Ishiguro et al. | ...... | 386/259 |
| 7,502,467 B2 * | 3/2009 | Brainard et al. | ...... | 380/44 |
| 7,502,933 B2 * | 3/2009 | Jakobsson et al. | ...... | 713/172 |
| 7,929,705 B2 * | 4/2011 | Kim et al. | ...... | 380/278 |
| 8,238,552 B2 * | 8/2012 | Weber | ...... | 380/44 |
| 2003/0007637 A1 * | 1/2003 | Banks | ...... | 380/51 |
| 2005/0010788 A1 * | 1/2005 | Craft | ...... | 713/187 |
| 2006/0059571 A1 * | 3/2006 | Chen et al. | ...... | 726/29 |
| 2006/0195402 A1 * | 8/2006 | Malina et al. | ...... | 705/50 |
| 2006/0256961 A1 * | 11/2006 | Brainard et al. | ...... | 380/44 |
| 2007/0067631 A1 * | 3/2007 | Westhoff | ...... | 713/168 |
| 2007/0113083 A1 * | 5/2007 | Volkovs et al. | ...... | 713/168 |

(Continued)

*Primary Examiner* — Tae Kim
(74) *Attorney, Agent, or Firm* — Banner & Witcoff, Ltd.

(57) ABSTRACT

An encryption key may be generated based on personalized unit data associated with a software download recipient, for example, a secure processor. In some aspects, the secure processor may generate a decryption key based on its personalized unit data, and a software download may be performed between the software provider and the secure processor using the generated encryption keys. The secure processor may then decrypt and load the software for execution. The encryption and decryption key generation may also be based on a sequence number or other data indicating one or more previous software downloads at the secure processor. Using the sequence number or other data, sequences of multiple encryption and/or decryption keys may be generated to support multiple software downloads to a secure processor.

21 Claims, 8 Drawing Sheets

(56) References Cited

U.S. PATENT DOCUMENTS

| | | | |
|---|---|---|---|
| 2008/0016353 A1* | 1/2008 | Carro | 713/171 |
| 2008/0092239 A1* | 4/2008 | Sitrick et al. | 726/27 |
| 2008/0092240 A1* | 4/2008 | Sitrick et al. | 726/27 |
| 2008/0301447 A1* | 12/2008 | Hughes et al. | 713/176 |
| 2009/0106561 A1* | 4/2009 | Ejiri | 713/193 |
| 2009/0110195 A1* | 4/2009 | Paykin et al. | 380/251 |
| 2010/0208888 A1* | 8/2010 | Weber | 380/44 |

* cited by examiner

DOWNLOADING OF DATA TO SECURE DEVICES

BACKGROUND

Content access transmission and communication systems, e.g., high speed data, audio and video content transmission systems, serve numerous users where each user has one or more devices (e.g., display devices, gateways, set top boxes or modems) which execute software. These devices often contain sophisticated and secure application software, for example, software to decode and process signals (e.g., at the user's location) in order to provide specific content or services to the user. It may be desirable to change the software code images executing at the user's locations in order to update the software, provide new services, and enhance existing services, etc. However, downloading secure software from a central facility to devices in the field presents risks, such as the risk of unauthorized code being loaded onto a device. For example, malicious users may attempt to load an authenticated secure application code image intended for one device onto other similar devices that should not receive the code image. Other malicious users may attempt to load a previous application code image onto a device in order to exploit known bugs in the previous software version. The complexity of securely downloading software is further compounded by the large number of devices that may be involved, and the different content and services that may be provided to each device.

SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

Some features described herein relate generally to providing a software download to a secure processor or other computing device. In some embodiments, a server or other computing device may generate an encryption key based on personalized unit data associated with the secure processor. The secure processor may generate a decryption key based on its own similar personalized unit data. A software download may be performed between the server and the secure processor in which an encrypted software code image is transmitted to the secure processor. The secure processor may then decrypt and load the software code image for execution.

Some additional features described herein relate to generating encryption and/or decryption keys for software downloads to one or more secure processors or other computing devices. In some embodiments, a software provider (e.g., a server) and/or a recipient device (e.g., a secure processor) may determine a sequence number or other data indicating one or more previous software downloads to a secure processor. Encryption and/or decryption keys for a software download may be generated based on personalized unit data including the determined sequence number or other data. In certain embodiments, sequences of multiple encryption and/or decryption keys may be generated to support multiple software downloads to a secure processor.

Other embodiments can be partially or wholly implemented on a computer-readable medium, for example, by storing computer-executable instructions or modules, or by utilizing computer-readable data structures.

The methods and systems of the above-referenced embodiments may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages of the disclosure will be apparent from the description and drawings, and from the claims.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

Figure 1:
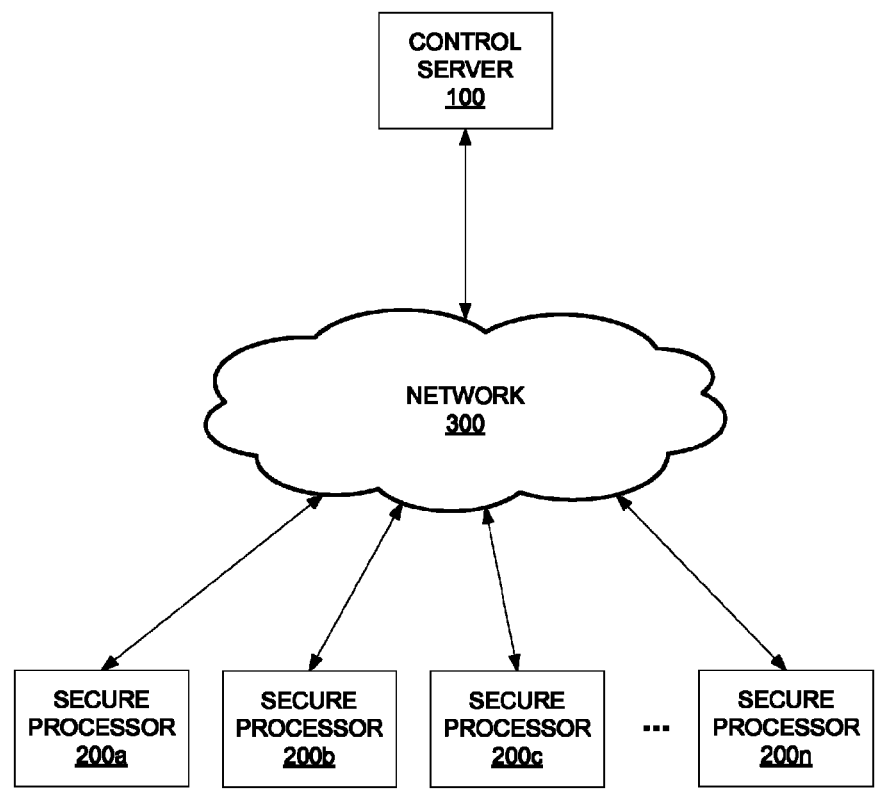
FIG. 1 shows a high-level diagram of a computing device in communication with a plurality of secure devices in accordance with various aspects of the disclosure.

FIG. 1 illustrates an example of a data distribution network on which many of the various features described herein may be implemented. In this example, a computing device such as control server 100 is configured to communicate with a plurality of secure devices, such as secure processors 200a-200n over a communication network 300. The control server 100 (or another computing device) may include one or more computing devices (e.g., network servers, personal computers, laptops, wireless devices, etc.) that may be configured to perform various functions and transmit various types of software and other data to the secure processors 200a-200n. For example, the control server 100 may include a push notification server configured to generate push notifications to deliver data and/or commands to the secure processors 200a-200n. The control server 100 may also include a content server configured to provide content to users based on software, instructions, and commands provided to the secure processors 200a-200n. This content may be, for example, video on demand movies, television programs, songs, text listings, etc. The control server 100 may also include software to validate user identities and entitlements, locate and retrieve requested content, encrypt the content, and initiate delivery (e.g., streaming) of the content to the requesting user, based on information received from and provided to the secure processors 200a-200n. The control server 100 may also include one or more application servers configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, the control server 100 may run an application responsible for collecting television program listings information and generating a data download available to secure processors 200a-200n for electronic program guide listings, available applications and services, and other data.

A secure processor may be a computing device comprising a processor with at least one protected memory (e.g., an internal memory or external protected memory) and at least one internal bus. Secure processors may also employ techniques such as cryptographic storage and physical tamper-resistant measures to protect data and/or software from theft, reverse engineering, and the like. Thus, secure processors 200a-200n illustrated in FIG. 1 may provide additional security for the software and other data stored in their protected memories as compared with conventional computing devices. For example, in a conventional device executing software that is stored in an external ROM, a malicious user that gained physical access to the device might replace or modify the ROM, thereby causing the device to execute a modified version of the software. Integrity of secure data may be similarly compromised in conventional devices communicating with external memory over external buses.

Although the example illustrated in FIG. 1, and other examples described herein, relate to secure processors, it should be understood that the present disclosure is not limited to any specific type(s) of computing devices. Rather, the various features and embodiments described may be performed on other computing devices capable of performing the functions described herein. In addition to secure processors, general computing devices may be used as recipient devices for securely downloading software as illustrated in FIGS. 1-8 and described in these examples. Additionally, the features and embodiments described herein may be used to transmit and receive other types of data, not necessarily secure software application code images. Other software, encryption and decryption keys, and secure and unsecure data may be transmitted between different computing devices using the techniques described herein.

Network 300 may be any type of information communication network, such as satellite, telephone, cellular, wireless, Internet, etc. One example may be an optical fiber network, a coaxial cable network or a hybrid fiber/coax distribution network. Such a network 300 may use a series of interconnected communication lines (e.g., coaxial cables, optical fibers, wireless, etc.) to connect secure processors 200a-200n residing in different locations to the control server 100 residing in a central office or headend. The control server 100 may transmit downstream information signals through the communication lines of network 300, and each of the secure processors 200a-200n may have a receiver used to receive and process those signals.

Figure 2:
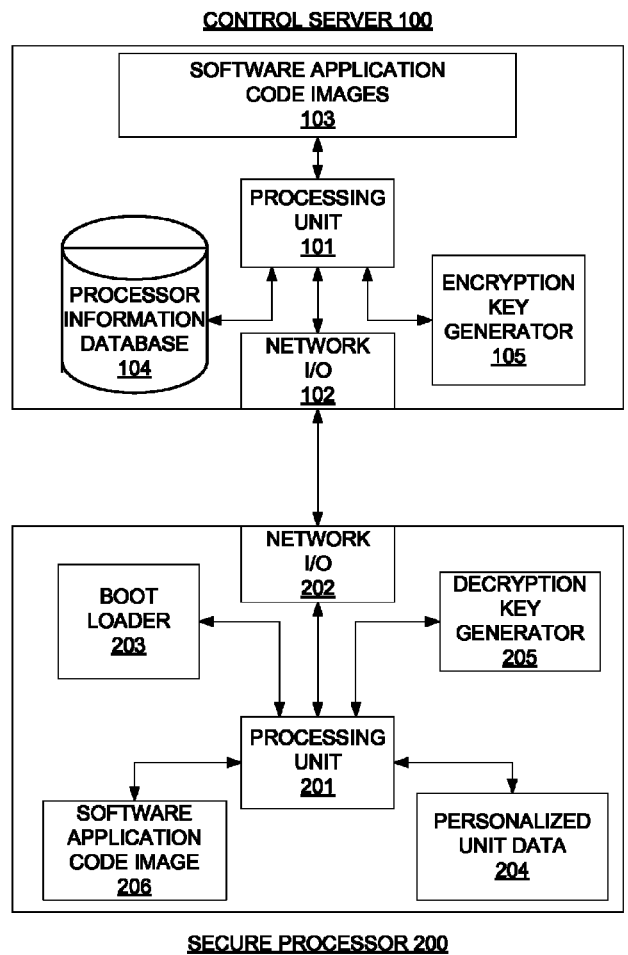
FIG. 2 illustrates some of the general elements of a computing device and a secure device in accordance with various aspects of the disclosure.

FIG. 2 illustrates several components of a control server 100 and a secure processor 200 on which various features described herein may be implemented. Although shown as a single computing device in FIG. 2, control server 100 may comprise one or more computing devices, including any number of general computing devices, such as network servers, personal computers, laptop computers, wireless devices, and the like. The computing device(s) of the control server 100 may include general hardware elements that can be used to implement any of the various computing devices discussed herein. For example, the control server 100 may include one or more processors 101, which may execute instructions of a computer program to perform any of the features described herein. The instructions may be stored in any type of computer-readable medium or memory, to configure the operation of the processor 101. For example, instructions may be stored in a read-only memory (ROM), random access memory (RAM), removable media (Universal Serial Bus (USB) drive, compact disk (CD) or digital versatile disk (DVD), floppy disk drive), or any other desired electronic storage medium. Instructions may also be stored in an attached (or internal) hard drive. The control server 100 may include one or more output devices, such as a display (or an external television), and may include one or more output device controllers, such as a video processor. The control server 100 may also include one or more user input devices, such as a remote control, keyboard, mouse, touch screen, microphone, etc. The computing device 200 may also include one or more network interfaces 102, such as input/output circuits (such as a network card) to communicate with a communication network 300. The network interface 102 may be a wired interface, wireless interface, or a combination of the two. In some embodiments, the network interface 102 may include a modem (e.g., a cable modem) configured to communicate over communication lines to an external network, an in-home network, a provider's wireless, coaxial, fiber, or hybrid fiber/coaxial distribution system (e.g., a DOCSIS network), or any other desired network.

Secure processor 200 may also include various general hardware elements, such as those discussed above for the control server 100, that can be used to implement any of the various devices, features and functions discussed herein. For example, secure processor 200 may include one or more internal processors 201, along with various protected or unprotected internal memory 203-206 storing data and/or software that may be accessible over one or more internal buses. Secure processor 200 may also include one or more network interfaces 202 for allowing direct or indirect communication with the control server 100 and other devices over communication network 300.

In addition to the general computing components discussed above, the control server 100 and secure processor 200 contain additional components for implementing various features and embodiments described herein. For example, control server 100 includes memory storing one or more application code images 103 to be transmitted to secure processors 200a-200n, a processor information database 104 storing data corresponding to the one or more secure processors 200a-200n, and an encryption key generator 105 for generating encryption keys for the code image transmissions. Similarly, secure processor 200 may include a boot loader 203 for loading a software application code image, protected memory storing one or more application code images 206, personalized unit data 204 containing unique data (e.g., serial number, seed value, etc.) associated with the secure processor 200, and a decryption key generator 205 for generating decryption keys for received application code images. Components 103-105 and 203-206 may be implemented as hardware, software, or a combination of hardware and software, in order to perform their associated functions, described in greater detail below.

Figure 3:
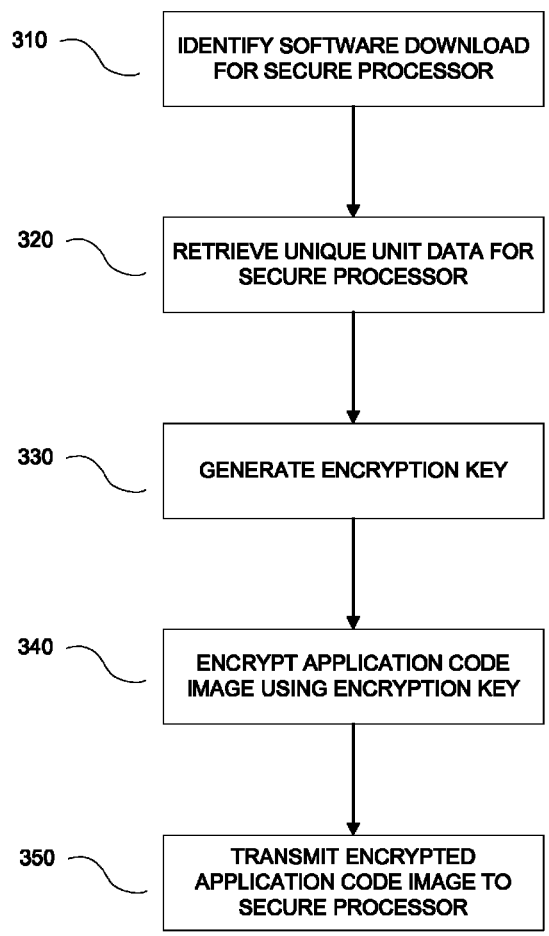
FIG. 3 shows a flow diagram of a process for transmitting encrypted software data to a secure device in accordance with various aspects of the disclosure.

Referring now to FIG. 3, a flow diagram is shown illustrating a method for transmitting an encrypted software application code image from a control server 100 to a secure processor 200.

In step 310, the control server 100 identifies a software download that is to be provided to the secure processor 200. The software download may represent an updated version of a software application currently loaded and executing on the secure processor 200. As is well-known in the art, software updates may include bug fixes and optimizations from previous versions, and/or may provide users with additional functionality. The software download in step 310 may also represent a new software application not currently installed at the secure processor 200. In these examples, after the new/updated software application has been developed, tested, and released, the manufacturer may provide a software application code image to the control server 100 with instructions to distribute the updated code image to one or more secure processors 200a-200n. Thus, a software download may be intended for and provided to a specific secure processor 200, or may be provided to a larger set of secure processors 200a-200n. For instance, a software download may be directed to all secure processors 200a-200n that are running the same version of an existing software application, or to all secure processors 200a-200n that have requested (e.g., ordered) additional services provided by a new software application, etc. The software application code image may be stored in the memory 103 of the control server 100, along with multiple other software application code images that correspond to new or updated software downloads intended for the same or other secure processors 200a-200n.

In step 320, the control server 100 retrieves personalized unit data for the secure processor 200 from the processor information database 104. For example, the processor information database 104 may include an encryption seed value for the secure processor 200. The encryption seed value or other personalized unit data may be unique to the secure processor 200 in that none of the other secure processors 200a-200n associated with the control server 100 may have the same personalized unit data. In certain embodiments, an encryption seed value or other personalized unit data stored in database 104 may be based on the serial number of the secure processor 200 to ensure uniqueness. As described below, storing unique personalized unit data at the control server 100 may allow the control server 100 and the secure processor 200 to generate unique encryption and decryption keys that cannot be used for software downloads to other secure processors 200a-200n. Thus, encryption keys based on unique personalized unit data may prevent application code images that are intended for one device from being accidentally or maliciously loaded onto another device not intended to receive the application code image.

In certain embodiments, the unique personalized unit data for the secure processor 200 retrieved in step 320 may include a software download sequence number. The software download sequence number may correspond to a number of previous software downloads or successful installations performed at the secure processor 200. For example, if secure processor 200 has undergone three previous software upgrades, the download sequence number "3" may be stored in the processor information database 104 for the secure processor 200. Another secure processor 200n that has undergone eight previous software upgrades would have a sequence number "8" stored in the processor information database 104, etc. Rather than using an incrementing sequence number as in this example, the processor information database 104 may store a decrementing software download sequence number limiting the number of downloads permitted on the secure processor 200. For example, a secure processor 200 may be configured so that it can only download a secure application code image a fixed number of times (e.g., 100) before the processor must be physically replaced. For instance, the number "100" may initially be stored in a location in the processor information database 104 associated with the secure processor 200. This number may be decremented with each software download performed on the secure processor 200, until reaching zero at which point no further software downloads may be permitted on secure processor 200. In certain embodiments, the control server might not store a software download sequence number, but may store other information serving a similar purpose. For example, the control server 100 may store a previous encryption key value (e.g., the most recently used encryption key) associated with the secure processor 200 in the processor information database 104, from which a number of previous keys or a next encryption key value may be generated.

Storing a software download sequence number or other similar data at the control server 100 may allow the control server 100 and secure processor 200 to generate unique encryption and decryption keys for each individual software download. Using such techniques, it may be possible to prevent an outdated code image from being accidentally or maliciously loaded onto the same secure processor 200 after it has been previously removed.

Figure 7:
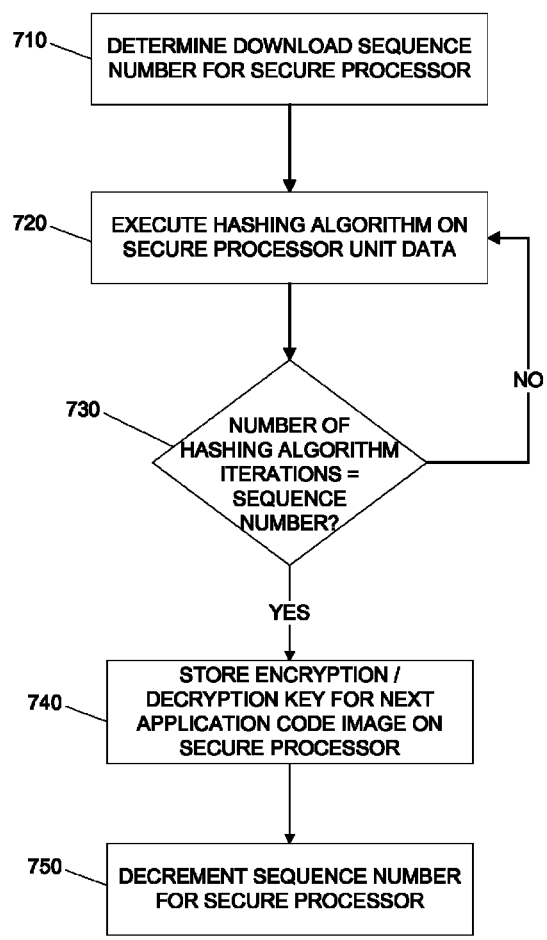
FIG. 7 shows a flow diagram of a process for generating a sequence of encryption and decryption keys in accordance with various aspects of the disclosure.

In step 330, the control server 100 generates an encryption key that may be used to encrypt the software application code image for transmission to the secure processor 200. A variety of conventional techniques may be used to generate the encryption keys. Additionally, specific techniques for generating encryption keys may be used in accordance with the various features described herein. For example, the control server 100 may use a hashing algorithm (e.g., Secure Hash Algorithm (SHA)-0, SHA-1, SHA-2, SHA-3) to generate the encryption key in step 330. As described above, the encryption key of step 330 may be uniquely generated based on the personalized unit data associated with the secure processor 200 and/or a sequence number or other data indicating one or more previous software downloads. FIG. 7, described below, illustrates one such method of generating sequences of unique encryption and decryption keys derived from personalized unit data (e.g., seed data). Using the technique illustrated in FIG. 7, or other similar techniques, the encryption key in step 330 may be generated by executing a hashing algorithm the same number of times as a stored download sequence number. The download sequence number may be decremented after the encryption key is generated, so that when a next encryption key is generated the hashing algorithm may be executed one fewer times and a different encryption key will be generated. Thus, each encryption key generated with such a technique may be an effective one-time use encryption key so that no other device will be able to decrypt and load the software encrypted with that key, and even the intended recipient device may only be able to decrypt and load the encrypted software a single time if desired by the software distributor. In other examples, sequences of encryption and decryption keys may be generated using other techniques. For instance, the control server 100 and secure processor 200 may generate and store corresponding ordered lists of encryption and decryption keys. Thus, using the features and techniques described herein, manufacturers and distributors of software for secure processors and other computing devices may have greater control and flexibility in providing new and updated software to a plurality of devices.

In step 340, the control server 100 encrypts the software application code image using the encryption key generated in step 330. As discussed above, different secure processors 200 may be provided different software applications and/or different versions of the same software application.

After identifying and retrieving the correct application code image from the memory 103 of the control server 100, any of a plurality of well-known encryption algorithms may be used to encrypt the code image using the encryption key. In certain embodiments, different secure processors 200a-200n may use different encryption algorithms, and multiple encryption algorithms may be supported by the control server 100. Therefore, encrypting the software application code image in step 340 may include determining which encryption algorithm is used by the secure processor 200. This information may be stored for each secure processor 200a-200n in the processor information database 104 or other location accessible to the control server 100.

In step 350, the control server 100 transmits the encrypted application code image to the secure processor 200. The encrypted application code image may be transmitted over the network 300, and authentication may be performed between the control server 100 and the secure processor 200 using any desired technique. As described above, even if the same application code image is provided to multiple secure processors 200a-200n, the encryption key used may be different for the different secure processors. As a result, in this example, encrypted code images transmitted to different secure processors may be different, even if the underlying application code image being transmitted is identical.

Figure 4:
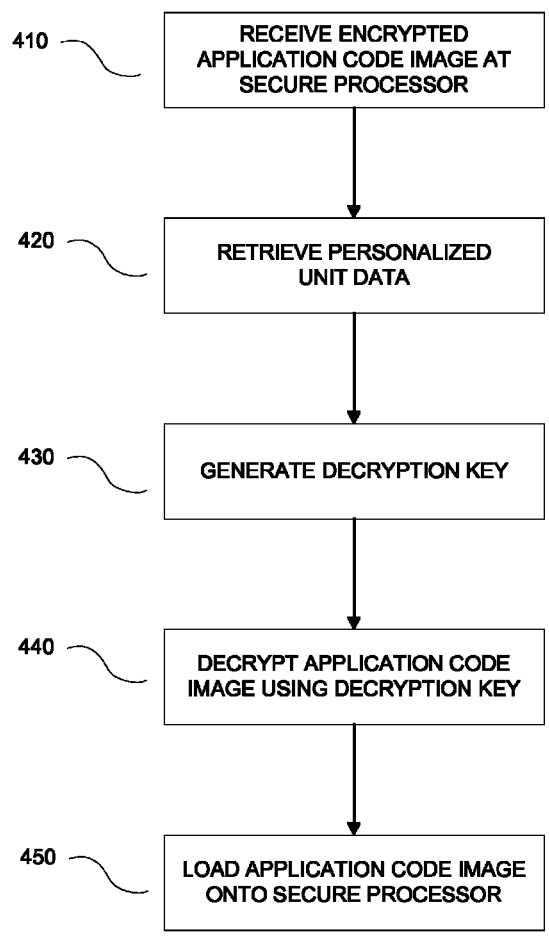
FIG. 4 shows a flow diagram of a process for receiving and loading data onto a secure device in accordance with various aspects of the disclosure.

Referring to FIG. 4, a flow diagram is shown illustrating a method for receiving and loading an application code image from a control server 100 onto a secure processor 200.

In step 410, an encrypted software application code image is received at a secure processor 200. The encrypted code image may be received over the network 300, and authenticated by the secure processor 200 using well-known techniques. The received application code image may correspond to the encrypted code image transmitted by the control server 100, as shown in FIG. 3 and described above. The encrypted code image received by the secure processor 200 may be, for example, a software upgrade of an existing application running on the secure processor 200. For example, an updated version of a secure application with additional functionality and/or bug fixes. The received encrypted code image may also comprise a new software application to be loaded and executed at the secure processor 200, for example, providing specific content and/or services ordered or requested for the secure processor 200.

In step 420, the secure processor 200 retrieves personalized unit data associated with the secure processor 200. In certain embodiments, the personalized unit data may be stored internally within the secure processor 200, for example, in a cryptographically protected internal memory 204. The personalized unit data stored at the secure processor 200 may be similar to the personalized unit data stored at the control server 100. For example, the personalized unit data at the secure processor 200 may include an encryption/decryption seed value based on the unique serial number of the secure processor 200. The personalized unit data may also include sequence number based on one or more previous software downloads that have been performed at the secure processor 200. In certain embodiments, since the personalized unit data stored at the secure processor 200 may be used to decrypt the code image encrypted by the control server, the personalized unit data stored at the secure processor 200 may be identical to the personalized unit data stored at the control server 100.

In step 430, the secure processor 200 generates a decryption key for decrypting the application code image received from the control server 100. A variety of conventional techniques (SHA-0, SHA-1, SHA-2, SHA-3, etc.) may be used to generate the decryption key in step 430. As described above, the encryption and decryption keys generated respectively by the control server 100 and the secure processor 200 may be unique based on the personalized unit data of the secure processor 200 and/or a sequence number or other data indicating one or more previous software downloads. FIG. 7, described below, illustrates one such method of generating sequences of unique encryption and decryption keys derived from the same personalized unit data (e.g., seed data). Using the technique illustrated in FIG. 7, or other similar techniques, the decryption key in step 430 may be generated by taking the personalized unit data of the secure processor 200 and executing a hashing algorithm on that data (e.g., the corresponding hashing algorithm used to generate the encryption key in step 330) the same number of times as a stored download sequence number stored at the secure processor 200 (e.g., corresponding to the same download sequence number stored at the control server 100). As discussed above in step 330, the download sequence number in the secure processor 200 also may be decremented in step 430 after the decryption key is generated. When the secure processor 200 generates a next decryption key, the hashing algorithm may be executed one fewer times and a different decryption key will be generated. Thus, each decryption key generated by the secure processor 200 with such a technique may be an effective one-time use key generated to decrypt an encrypted application code image from the control server 100 specifically intended for the secure processor 200, so that no other secure processor 200a-200n may be able to decrypt the encrypted software code image received in step 410, and even the secure processor 200 might only be able to decrypt and load the application code image a single time.

In step 440, the secure processor 200 decrypts the encrypted application code image using the decryption key generated in step 430. As discussed above, any of a plurality of well-known decryption algorithms may be used to decrypt the encrypted software application code image. In certain embodiments, secure processor 200 may support multiple decryption algorithms. For example, the secure processor 200 may be configured to receive software downloads from multiple different control servers, each of which may use different encryption algorithms. In this example, the secure processor 200 may include application software 240 for decryption key generation and decryption in accordance with the one or more supported decryption algorithms. Therefore, before decrypting the encrypted code image in step 440, the secure processor 200 may first determine which encryption algorithm was used by the control server 100 to encrypt the code image. This information may be determined from the encrypted code image itself, or may be retrieved from the memory of the secure processor 200.

In step 450, the decrypted application code image is loaded onto the secure processor 200. Boot loader 203 may load the code image into the executable memory 206 of the secure processor 200. The secure processor 200 may then initiate the execution of the new application code image.

Figure 5:
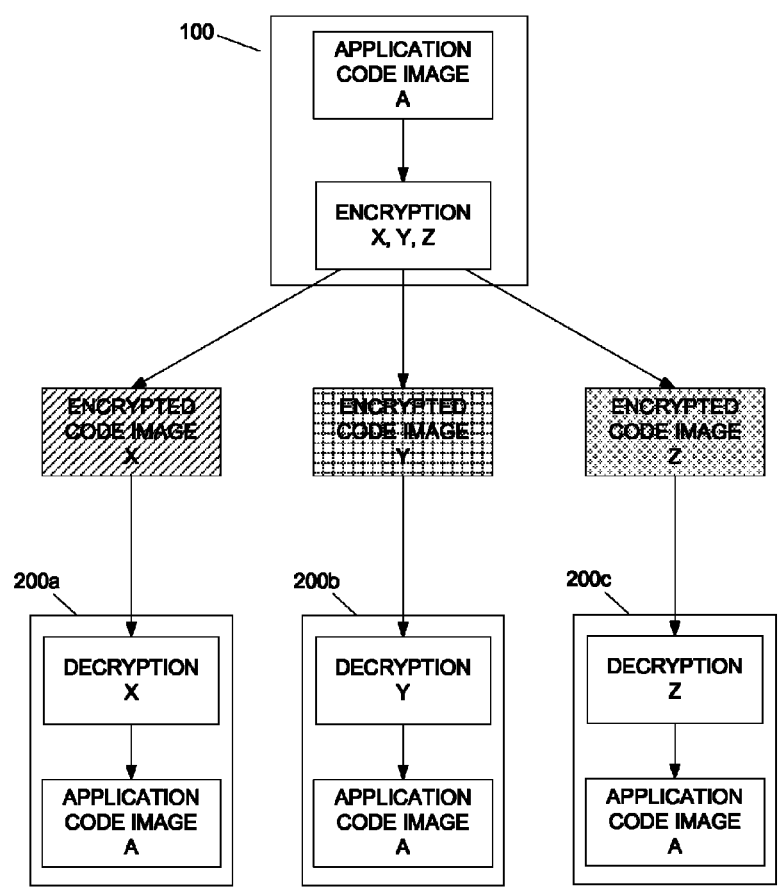
FIG. 5 illustrates a computing device providing data to a plurality of secure devices in accordance with various aspects of the disclosure.

Referring now to FIG. 5, a high-level diagram is shown illustrating an example in which a control server 100 provides the same application code image to a plurality of secure processors 200a-200c. In this example, an operator (e.g., human operator, operational software, etc.) at the control server 100 has determined that Application Code Image A should be distributed to multiple secure processors 200a-200c. Application Code Image A may correspond to a new or updated software version containing bug fixes, additional functionality, enhanced features and content, etc. The control server 100 may select a specific application code image based on the intended set of recipient devices. That is, Application Code Image A in this example may contain software specifically intended for secure processors 200a-200c, and not intended for other secure processors.

In this example, Application Code Image A may be encrypted differently for each of the three secure processors 200a-200c. As described above, the control server 100 may generate different encryption keys based on personalized unit data for each secure processor 200a-200c intended to receive the application code image. Therefore, although the same Application Code Image A may be transmitted to each secure processor 200a-200c (and after decryption identical copies of Application Code Image A may reside in each secure processor 200a-200c), the control server 100 may perform separate encryption processes for each secure processor 200a-200c using different encryption keys, so that Encrypted Code Images X, Y, and Z may comprise different encrypted code images. Additionally, application code images may be encrypted such that they can only be decrypted by their intended recipient. For example, if Encrypted Code Image X were transmitted to secure processor 200b or 200c, the decryption keys generated by these secure processors would be unable to decrypt the received code image. This may prevent new or updated software that is intended for one or more secure processors from being accidentally or maliciously loaded onto other secure processors for which the software is not intended.

Figure 6B:
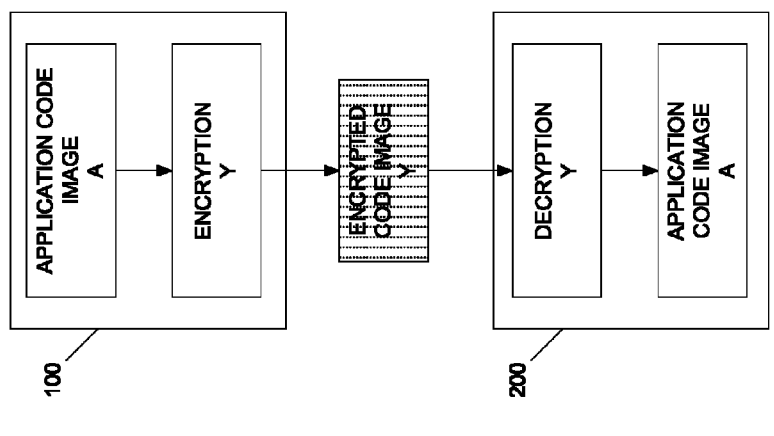
FIGS. 6A and 6B illustrate a computing device providing data to a secure device multiple times in accordance with various aspects of the disclosure.
Figure 6A:
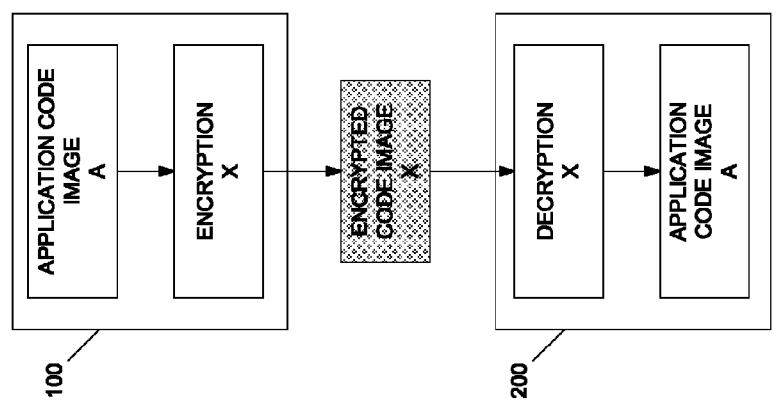

FIGS. 6A and 6B are high-level diagrams showing an example in which a control server 100 provides the same application code image to a secure processor 200 multiple times. In this example, an operator at the control server 100 has determined that the same Application Code Image A should be provided to secure processor 200 a first time (FIG. 6A) and then again at a second later time (FIG. 6B), whether or not a different application image is currently loaded in the secure processor. This situation may arise, for example, when the secure processor 200 receives an updated software application or version, and then a subsequent determination is made to return the secure processor 200 to its previous application or version.

As described above, the control server 100 may encrypt the application code image using an encryption key based on personalized unit data that is unique for the secure processor 200. Additionally, this personalized unit data may include a software download sequence number, or other similar information, so that the encryption key is unique for each individual software download. Therefore, in this example, even though the same Application Code Image A is encrypted by the same control server 100 for the same secure processor 200, the Encrypted Code Images X and Y may be different encrypted code images. Therefore, if Encrypted Code Image X were re-transmitted to secure processor 200 at the later time in FIG. 6B (instead of Encrypted Code Image Y), the updated decryption key generated by secure processor 200 would be unable to decrypt the re-transmission of Encrypted Code Image X. This may prevent older versions of software from being accidentally or maliciously loaded onto secure processors for which that software is no longer intended.

Referring to FIG. 7, a flow diagram is shown illustrating a method of generating a sequence of encryption and/or decryption keys. In this example, similar (or even identical) processes may be used for generating encryption keys by the control server 100, and generating decryption keys by the secure processor 200. Therefore, the method shown in FIG. 7 and/or similar examples may be used for both the encryption key generation (step 330) performed by the control server 100 and the decryption key generation (step 430) performed by the secure processor 200.

In step 710, the key generator determines a download sequence number for the secure processor 200. In this step, if the control server 100 is generating an encryption key, it may retrieve a download sequence number for the secure processor 200 from the processor information database 104. If the secure processor 200 is generating a decryption key, it may retrieve the download sequence number from a protected memory 204 storing its personalized unit data (e.g., seed value, processor serial number, current software loaded, current software versions, download sequence number, maximum number of allowable downloads, etc.).

In the example shown in FIG. 7, the download sequence number may correspond to a number of additional software downloads that may be permitted at the secure processor 200. For instance, if the secure processor 200 is configured to allow no more than 50 software downloads during its lifetime, then the initially stored sequence number may be "50." This number may be decremented ("49", "48", "47", etc.) after each successful software download. When the download sequence number reaches zero, the control server 100 will not provide and the secure processor 200 will not allow any further software downloads. Of course, any other integer may be used as an initially stored download sequence number. In other examples, the download sequence number may reset one or more times after reaching zero, thus allowing additional (and potentially unlimited) software downloads from the control server 100 to the secure processor 200. Allowing resetting download sequence numbers may result in the reuse of encryption/decryption keys after the download sequence number reaches zero and is reset.

In certain embodiments, a download sequence number may be an incrementing number corresponding to the number of previous software downloads that have been performed at the secure processor 200. In such examples, the total number of software downloads permitted for the secure processor 200 may be limited or unlimited. In other examples, other information may be used instead of a download sequence number, such as previous encryption or decryption key value from which new and unique encryption and decryption keys may be generated.

In steps 720-730, a hashing algorithm is executed a number of times on the personalized unit data of the secure processor 200. In this example, the hashing algorithm is executed the same number of times as the download sequence number. Using the above example, the hashing algorithm may be executed in a feedback loop 50 times for the first software download by the secure processor 200, 49 times for the second software download by the secure processor 200, and so on. A Secure Hashing Algorithm (e.g., SHA-1), or other similar algorithm may be used. In this example, the output of one execution 720 of the algorithm may be used as an input to the next execution 720, thus resulting in a different output from the hashing algorithm for each successive execution of step 720. Steps 720-730 may therefore generate a sequence of unique encryption or decryption keys based on the personalized unit data (e.g., seed value) of the secure processor 200.

In step 740, the last key in the sequence of encryption or decryption keys generated in steps 720-730 may be stored by the control server 100 or secure processor 200 so that it may be used to encrypt or decrypt the software code image. Therefore, a control server 100 generating a sequence of 50 encryption keys in steps 720-730 might only store the $50^{th}$ encryption key in step 740, and may later use that encryption key to encrypt the application code image for the secure processor 200 (step 340). Similarly, the secure processor 200 may generate a sequence of 50 decryption keys corresponding to the sequence of 50 encryption keys generated at the control server. The secure processor 200 might only store the $50^{th}$ decryption key in step 740, and may later use that decryption key to decrypt the application code image received from the control server 100 (step 440). Since the same or corresponding personalized unit data (e.g., seed value), and the same or corresponding sequence numbers (e.g., 50) may be used by the control server 100 and the secure processor 200, the encryption/decryption may be performed successfully. For example, the $50^{th}$ encryption key generated by the control server 100 may correspond to the $50^{th}$ decryption key generated by the secure processor 200, the $49^{th}$ encryption key generated by the control server 100 may correspond to the $49^{th}$ decryption key generated by the secure processor 200, and so on.

In step 750, the download sequence number corresponding to the secure processor 200 is decremented. As discussed above, the control server 100 may update the download sequence number by modifying the appropriate record in the processor information database 104 corresponding to the secure processor 200. The secure processor 200 may perform a similar operation by updating its download sequence number within the protected memory 204. In certain embodiments, the control server 100 and/or secure processors 200a-200n may confirm that a software download was successful before decrementing their respective download sequence numbers. For example, the control server 100 might wait until receiving a confirmation message from the secure processor 200 indicating the that code image was successfully downloaded, successfully decrypted or authenticated, and/or successfully executed before decrementing its download sequence number for that secure processor 200. In other examples, the control server 100 need not wait a confirmation that a software download was successfully downloaded, successfully decrypted or authenticated, or successfully executed, before decrementing its download sequence number. For instance, the control server 100 may automatically decrement the sequence number after receiving any confirmation from the secure processor 200, whether or not the download was successful. In this example, the control server 100 and secure processor 200 may both be configured to decrement their sequence numbers as long as a download attempt goes through the decryption/authentication process, regardless of whether the decryption/authentication process passes or fails.

Subsequent software downloads from the control server 100 to the secure processor 200 may be similarly processed using the updated download sequence numbers stored at each device. In this example, the control server 100 and the secure processor 200 would each retrieve a download sequence number of 49 for the next software download, and each would generate a sequence of 49 encryption or decryption keys as described above. Since the personalized unit data (e.g., seed value) is unchanged for the secure processor 200, the 49 encryption keys generated by the control server 100 may be the same as the first 49 encryption keys generated for the previous software download. Only the $50^{th}$ encryption key, the encryption key that was used to encrypt the first software download, would not be generated in the next execution of steps 720-730 in this example. Similarly, the secure processor 200 would generate the same first 49 decryption keys that were generated in the previous execution of steps 720-730, but would not generate the $50^{th}$ decryption key that was used to decrypt the first software download. Therefore, for the second software download, the control server 100 and secure processor 200 would use the $49^{th}$ encryption and decryption keys in their respective key sequences to encrypt and decrypt the software download. After the second software download, both the control server 100 and the secure processor 200 would decrement their download sequence numbers to 48, and so on.

Potential advantages of the technique illustrated in FIG. 7 may provide manufacturers and distributors of software to secure processors and other computing devices with greater control and flexibility in downloading new and updated software to a plurality of devices. Using such techniques, the control server 100 may generate effective one-time use encryption keys and the secure processor 200 may generate effective one-time use decryption keys, so that other devices (e.g., secure processors 200a-200n) may be prevented from downloading and executing software not intended for those devices. As discussed above, even the intended recipient device might only be able to decrypt and load the software a single time if desired by the software distributor.

Additionally, in the example shown in FIG. 7, sequences of unique encryption and decryptions keys are generated by deriving later keys in the sequence from the earlier keys in the sequence. That is, using the encryption algorithm and feedback loop in steps 720-730, the $1^{st}$ encryption key is generated, then the $2^{nd}$ encryption key is derived from the $1^{st}$ key, then the $3^{rd}$ encryption key is derived from the $2^{nd}$ key, and so on. Thus, if an encryption or decryption key becomes compromised or exposed, for example, by an accident data leak or a malicious user monitoring and hacking a software download, the exposed key potentially could be used to generate subsequent keys in the sequence. However, earlier keys cannot easily be derived from later keys in the encryption and decryption sequences. Therefore, if a software download from a control server 100 to a secure processor 200 were compromised (e.g., hacked) so that the $49^{th}$ encryption key in the sequence were exposed, that key could potentially be used to generate the $50^{th}$ encryption key in the sequence. However, the $50^{th}$ encryption key has already been used and will not ever be used again in this example. The next encryption key that will be used for a software download is the $48^{th}$ key in the sequence, which cannot be easily derived even if the $49^{th}$ key is known. Therefore, this technique provides additional potential advantages by protecting the security and integrity of the encryption and decryption key sequences used in the software downloads, even if past encryption and decryption keys are exposed.

Figure 8:
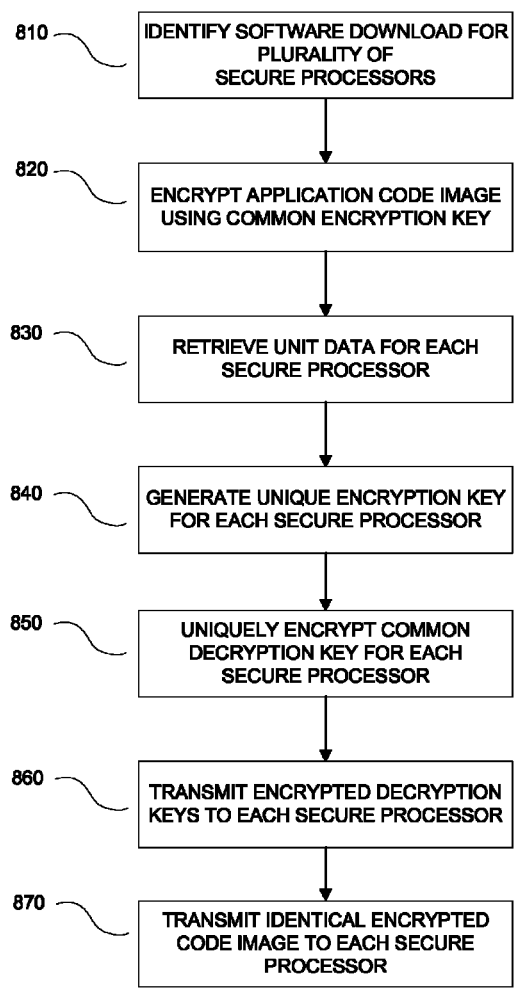
FIG. 8 shows a flow diagram of a process for transmitting an encrypted software code image to a plurality of secure devices in accordance with various aspects of the disclosure.

Referring now to FIG. 8, a flow diagram is shown illustrating a method of transmitting an encrypted software code image to a plurality of secure processors. In this example, an operator (e.g., human operator, operational software, etc.) at the control server 100 may determine that an identical application code image should be transmitted to a plurality of security processors 200a-200n. As described in the steps below, this example may be similar to the examples previously discussed. However, in this example, identical encrypted code images may be transmitted to the different security processors 200a-200n. In this example, rather than (or in addition to) separately encrypting the application code images transmitted to different secure processors 200a-200n, the control server 100 may separately encrypt decryption keys that can be used to decrypt an application code image sent to each of the secure processors 200a-200n.

In step 810, a control server 100 may identify a software download to be provided to a plurality of secure processors 200a-200n. As discussed above, the software download may represent a new software application or an updated version of an existing application currently loaded on the secure processors 200a-2-00n. In step 820, the control server 100 generates an encryption key and encrypts the application code image using the encryption key. Thus, unlike previous examples described herein in which an application code image is encrypted multiple times with different encryption keys corresponding to different secure processors 200a-200n, in this example the application code image may be encrypted a single time only using a common encryption key.

In step 830, the control server 100 retrieves the personalized unit data for each of the secure processors 200a-200n that will be provided the software. As described in the above examples, this personalized unit data (e.g., seed values, download sequence numbers, etc.) may be stored by the control server 100 in the processor information database 104. In step 840, the control server 100 generates a unique encryption key for each of the recipient secure processors 200a-200n. This step may be similar (or identical) to step 330 and other examples in which unique encryption keys are generated for different secure processors 200a-200n.

In step 850, the control server 100 uses the unique encryption keys generated in step 840 to separately encrypt the common decryption key that may be used for decrypting the application code image. In step 860, the control server 100 transmits the separately encrypted common decryption key to each of the secure processors 200a-200n. Thus, in this example, each of the secure processors 200a-200n will receive the same common decryption key for decrypting the application code image. However, the common decryption key will be separately encrypted for each of the secure processors 200a-200n using the techniques described above. In this example, a secure processor 200 may receive and decrypt the uniquely encrypted common decryption key intended for that secure processor, whereas none of the other secure processors 200a-200n would be able to decrypt the common decryption key after it was encrypted specifically for secure processor 200. Each secure processor 200a-200n would thus use its own personalized unit data 204 and would generate its own decryption key in order to decrypt the common decryption key for the application code image.

In step 870, the control server 100 transmits the same encrypted code image to each of the recipient secure processors 200a-200n. Each secure processor 200a-200n, having separately received and uniquely decrypted the common decryption key, then may decrypt and load the application code image using the common decryption key.

The example illustrated in FIG. 8 incorporates various techniques and features described herein, while also permitting a control server 100 to encrypt and transmit a single encrypted application code image to a plurality of secure processors 200a-200n or other computing devices. Potential advantages may result from this technique and similar examples when the size of an application code image is large and the time/costs associated with encrypting and/or transmitting the application code image are significant. For example, when transmitting very large application code images, or when using very time-consuming encryption algorithms to encrypt application code images, it may be potentially beneficial to use the unique one-time encryption and decryption keys only to encrypt/decrypt the common decryption key, and not the application code image itself.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
responsive to receiving first data corresponding to a software download, retrieving, by a secure device, personalized unit data and a sequence number stored in a protected memory of the secure device;
iteratively executing, by the secure device, a decryption key generation algorithm a number of times based on the sequence number to generate a first decryption key based on the personalized unit data and the sequence number;
decrypting, by the secure device, the first data using the first decryption key; and
in response to determining, by the secure device, that the decryption of the first data was successful, that the software download was successfully executed by the secure device, or both:
transmitting a confirmation message to a control server for incrementing or decrementing a sequence number associated with the secure device at the control server.

2. The method of claim 1, further comprising:
in response to determining that the decryption of the first data using the first decryption key was successful,
loading the first data into an executable memory of the secure device.

3. The method of claim 1, further comprising:
receiving second data;
in response to receiving the second data, generating a second decryption key based on the personalized unit data and the incremented or decremented sequence number, the generating comprising iteratively executing the decryption key generation algorithm a number of times based on the incremented or decremented sequence number, wherein the second decryption key is different than the first decryption key; and
decrypting the second data using the second decryption key.

4. The method of claim 3, wherein generating the first decryption key comprises iteratively generating a predetermined number (N) of decryption keys using a decryption key generation algorithm and using the Nth generated decryption key as the first decryption key.

5. The method of claim 4, wherein generating the second decryption key comprises iteratively generating N−1 decryption keys using the decryption key generation algorithm and using the Nth−1 generated decryption key as the second decryption key.

6. The method of claim 3, wherein the first data corresponds to a first software code image, and wherein the second data corresponds to a second software code image.

7. The method of claim 1, wherein generating the first decryption key comprises using a Secure Hash Algorithm (SHA).

8. The method of claim 1, wherein the personalized unit data is based on a serial number of the secure device.

9. The method of claim 1, wherein the determining, by the secure device, comprises determining that the decryption of the first data using the first decryption key was successful.

10. The method of claim 1, wherein the
determining, by the secure device, comprises determining that the software download was successfully executed by the secure device.

11. The method of claim 1, wherein the personalized unit data is based on at least one of a type or version of software currently loaded on the secure device.

12. A method comprising:
identifying, by a computing device, a first software download for a first secure processor;
retrieving, by the computing device, first personalized unit data associated with the first secure processor;
determining, by the computing device, a first sequence number associated with the first secure processor, the first sequence number corresponding to a number of previous software downloads performed at the first secure processor;
generating, by the computing device, a first encryption key based on the first personalized unit data and the first sequence number, the generating comprising iteratively executing an encryption key generation algorithm a number of times based on the first sequence number;
encrypting, by the computing device, first software code associated with the first software download using the first encryption key;
transmitting, by the computing device, the encrypted first software code to the first secure processor; and
in response to receiving a confirmation message, by the computing device, incrementing or decrementing the first sequence number associated with the first secure processor, the confirmation message indicating that the encrypted first software code was successfully decrypted by the first secure processor, that the encrypted first software code was successfully loaded and executed by the first secure processor, or both.

13. The method of claim 12, further comprising:
retrieving second personalized unit data associated with a second secure processor;
generating a second encryption key based on the second personalized unit data associated with the second secure processor, wherein the second encryption key is different from the first encryption key;
encrypting the first software code using the second encryption key; and
transmitting the first software code encrypted with the second encryption key to the second secure processor.

14. The method claim 12, further comprising:
storing at the computing device the incremented or decremented first sequence number in a memory, the incremented or decremented first sequence number corresponding to the number of previous software downloads performed at the first secure processor.

15. The method of claim 14, further comprising:
identifying a second software download for the first secure processor;
generating a second encryption key based on the first personalized unit data associated with the first secure processor and the incremented or decremented first sequence number, the generating comprising iteratively executing the encryption key generation algorithm a number of times based on the incremented or decremented first sequence number, wherein the second encryption key is different than the first encryption key;
encrypting a second software code associated with the second software download using the second encryption key; and
transmitting the encrypted second software code to the first secure processor.

16. The method of claim 12, wherein generating the first encryption key comprises using a Secure Hash Algorithm (SHA).

17. The method of claim 12, further comprising:
storing, at the computing device, a plurality of unique personalized unit data and a plurality of software download sequence numbers, wherein each unique personalized unit data and each software download sequence number correspond to one of a plurality of secure processors associated with the computing device.

18. The method of claim 12, wherein, the received confirmation message indicates that the encrypted first software code was successfully decrypted by the first secure processor.

19. The method of claim 12, wherein, the received confirmation message indicates that the encrypted first software code was successfully loaded and executed by the first secure processor.

20. A method, comprising:
identifying, by a control server, a first software download for a first secure processor;
retrieving, by the control server, from a processor information database, first personalized unit data and a first sequence number corresponding to the first secure processor;
executing, by the control server, an encryption key generation algorithm to generate a first encryption key corresponding to the first secure processor, wherein the encryption key generation algorithm is executed using the first personalized unit data, and wherein the encryption key generation algorithm is executed iteratively a number of times based on the first sequence number;
encrypting, by the control server, the first software download using the first encryption key;
transmitting, by the control server, the encrypted first software download to the first secure processor;
receiving, by the control server, a confirmation message from the first secure processor indicating that the encrypted first software download transmitted to the first secure processor was successfully decrypted, loaded, and executed by the first secure processor; and
in response to receiving the confirmation message from the first secure processor, decrementing, by the control server, the first sequence number corresponding to the first secure processor within the processor information database.

21. The method of claim 20, further comprising:
receiving, by the first secure processor, the encrypted first software download from the control server;
retrieving, by the first secure processor, personalized unit data and the sequence number from a protected memory of the first secure processor;
executing, by the first secure processor, a decryption key generation algorithm to generate a decryption key, wherein the decryption key generation algorithm is executed using the personalized unit data, and wherein the decryption key generation algorithm is executed iteratively a number of times based on the sequence number;
decrypting, by the first secure processor, the encrypted first software download received from the control server, using the decryption key;
loading and executing, by the first secure processor, the decrypted first software download;
determining, by the first secure processor, that the execution of the decrypted first software download was successful;
decrementing, by the first secure processor, the sequence number stored in the protected memory of the first secure processor, in response to determining that the execution of the decrypted first software download was successful; and transmitting, by the first secure processor, a confirmation message to the control server, the confirmation message indicating that the encrypted first software download received from the control server was successfully executed by the first secure processor.

* * * * *

UNITED STATES PATENT AND TRADEMARK OFFICE
CERTIFICATE OF CORRECTION

| | |
|---|---|
| PATENT NO. | : 8,792,637 B2 |
| APPLICATION NO. | : 13/302639 |
| DATED | : July 29, 2014 |
| INVENTOR(S) | : Lawrence W. Tang et al. |

Page 1 of 1

It is certified that error appears in the above-identified patent and that said Letters Patent is hereby corrected as shown below:

In the Specification:

Column 13, Detailed Description, Line 6:
    Please delete "2-00n" and insert --200n--

In the Claims:

Column 16, Claim 18, Line 8:
    Delete "wherein," and insert --wherein--

Column 16, Claim 19, Line 11:
    Delete "wherein," and insert --wherein--

Signed and Sealed this
Fifth Day of April, 2016

Michelle K. Lee
*Director of the United States Patent and Trademark Office*